INVENTOR.
HERMANES J.M.DE HAAN
BY
Frank R. Trifari
AGENT

United States Patent Office 3,560,945

Patented Feb. 2, 1971

3,560,945

MAGNETIC STORAGE DEVICE

Hermanus Johannus Maria de Haan, Emmasingel, Eindhoven, Netherlands, assignor to U.S. Philips Corporation, New York, N.Y., a corporation of Delaware Filed Sept. 2, 1969, Ser. No. 854,380

Claims priority, application Netherlands, Sept. 18, 1968, 6813303

Int. Cl. G11c 5/04, 11/06

U.S. Cl. 340—174 2 Claims

ABSTRACT OF THE DISCLOSURE

Magnetic storage device comprising a plurality of apertured storage elements of magnetic material connected by parts of the same material to form a mechanically integral body, control-conductors being passed through the apertures of the elements so that currents through the conductors can affect only the elements coupled with the conductors due to the arrangement of the connecting parts whereby no magnetic flux can occur along the connecting parts.

Figure 1:
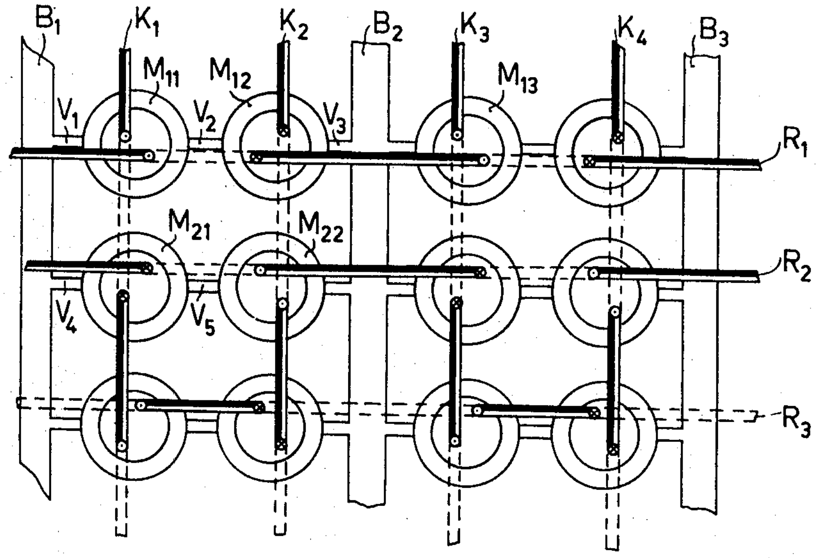

The invention relates to a magnetic storage device comprising a plurality of storage elements of magnetic material each having at least one aperture and arranged in rows and columns of a matrix in the same plane. The elements of the same column are magnetically coupled to the same column conductor and the elements of the same row are magnetically coupled to the same row conductor. The elements may be formed by rings or be provided with two or more apertures and may have the shape of so-called three-hole elements, which as compared with cores, have the advantage that high control-currents can be employed so that the switching operations can be rapid.

Twisting wires in different directions through separate storage elements is a difficult operation. Attempts have therefore been made to find solutions in which the storage elements are mechanically united to form a single body which can be manipulated much more easily than separate elements. This provides the advantage that at least some of the conductors can be applied to the body in the form of printed wiring.

In a known device of the kind set forth the elements are formed by holes in a plate of magnetic material. The direction of magnetization around the various apertures, which may be varied under the control of currents through conductors passing through said apertures, provides the desired storing function. This device has various disadvantages. Since the magnetic field H decreases with an increasing distance from a current-conveying conductor, the magnetic field is not uniform and the effective magnetization curve representing the relationship between the actuating magnetic flux and the current has an unfavorable shape. The magnetization of a material around a storing place will be changed only as far as the magnetic force is at said place higher than the coercive force. Since at the boundary of the region where the magnetization is changed the magnetic field strength exceeds the coercive force by very little, this storage device operates slowly and a storage element is likely to be affected by another element. In other words, a certain degree of magnetic cross-talk may occur through the magnetic material between the storage elements. It is therefore necessary to provide a comparatively large distance between the elements.

These difficulties are not involved in a further known storage device in which separate storage elements are embedded in a support of non-magnetic material prior to the application of the wiring. This method is, however, fairly circuitous and expensive because the storage elements have to be manufactured separately, after which they have to be arrayed in the support with correct directions of orientation.

It is the object of this to provide an effective solution of this problem.

In the storage device according to the invention a plurality of beams of magnetic material extend in the direction of the columns and the storage elements are each provided with two bridges of magnetic material located in the plane of symmetry of the elements and extend in the direction of the rows. The bridges serve to connect the elements with an adjacent element or with a beam. The column conductors are passed alternately upwards and downwards through apertures in the elements, and the row conductors are passed as many times upwardly and downwardly through apertures in the elements located between two beams.

In principle the conductors may be passed through different apertures of the same storage element. In this device the relative magnetic action between the elements is negligible, even if comparatively strong currents are employed. Although the elements are interconnected through magnetic parts, the magnetic properties of the elements are not at all affected, or in other words the operation of the storage device is completely the same as that of a storage device having loose elements because of the fact that no magnetic flux passes the bridges and beams.

Since the storage elements as well as the connecting parts are made of magnetic material, the whole storage plate may be manufactured in a single operation, for example, by photographic etching from a sheet of Permalloy.

Figure 2:
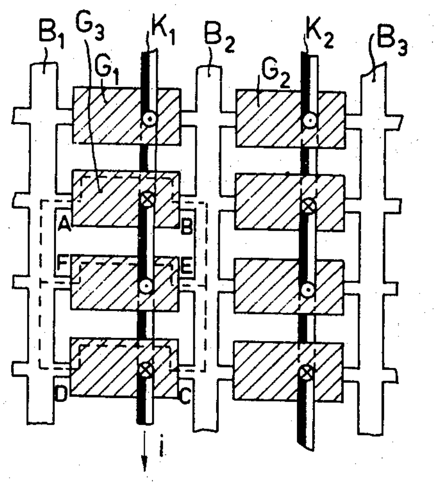

The invention will be described more fully with reference to the drawing, wherein FIG. 1 shows a general configuration of cores in use with the invention, FIG. 2 shows groups of elements along columns, and FIG. 3 groups of elements along rows.

FIG. 1 shows an embodiment of a storage device comprising a plurality of annular cores $M_{11}$, $M_{12}$, $M_{13}$, $M_{21}$, etc. of magnetic material, arrayed in known manner in rows and columns of a matrix. The cores are arranged group-wise between beams $B_1$, $B_2$, $B_3$ of magnetic material, extending in th direction of the columns. In the example shown every two cores are located in a row between two beams, but in principle this number may be higher. In this case, the cores have only one aperture and the said number has, in principle, to be an even number, as will be set out hereinafter. The cores are each provided with two connecting parts or bridges of magnetic material $V_1$, $V_2$, $V_3$, $V_4$, $V_5$ and so on, by which they are mechanically connected with an adjacent core of the same row or with one of the beams $B_1$, $B_2$, and so on. These bridges are located in a plane of symmetry passing through the cores so that, for example, in the core $M_{11}$ the reluctance of the bridge $V_1$ towards the bridge $V_2$ passing along the upper side of the aperture is equal to that along the lower side of the aperture.

The cores thus form with the bridges and beams a mechanical unit.

The cores of the same column are furthermore magnetically coupled with the same column conductor $K_1$, $K_2$, $K_3$, $K_4$, said conductors being passed alternately in one direction and in the other (upwardly and downwardly) through the cores. These conductors may in principle also be provided in the form of printed wiring if, between the cores, bridges (not shown) of non-magnetic material are provided or, as an alternative, the openings between the cores are filled out with such a material.

The cores of the same row are furthermore magnetically coupled with the same row conductor $R_1$, $R_2$, $R_3$, which conductors are also passed alternately upwards and downwards through the cores. It is advantageous to have also these conductors formed by printed wiring passing along the cores and bridges.

Magnetic storage elements of different shapes, for example, three-hole elements, may be united in a similar manner by means of bridges and beams to form a mechanical entity of easy manipulation.

Figure 3:
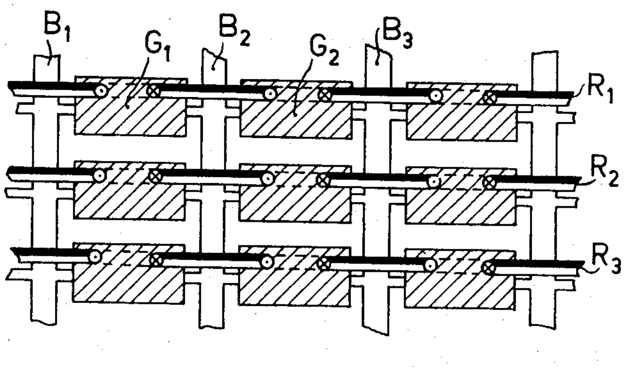

In FIGS. 2 and 3 the shaded rectangles $G_1$, $G_2$, $G_3$, etc. represent schematically groups of storage elements on different rows of the matrix, which are arranged in the manner described through bridges between the beams $B_1$, $B_2$, etc. FIG. 2 shows schematically column conductors $K_1$, $K_2$, which are passed alternately upwards and downwards through one aperture of an element of the consecutive groups. When a current $i$ is supplied, for example, to the conductor $K_1$, this must not magnetically affect other elements of the same group or elements of other groups, arranged, for example, between the beams $B_2$ and $B_3$, for example $G_2$. This means that under the control of the current flowing through the conductor $K_1$ no magnetic flux must be switched which extends over an arbitrary path through beams and bridges. The magnetic field along the beams has to be zero. This has to apply to any closed contour, for example, ABCDA. It is known that the integral of the magnetic field H along any contour is equal to the electric current $i$ embraced in total by this contour. In the case of the contour ABCDA the current $i$ is embraced twice, that is to say, once in a positive sense and once in a negative sense, so that the current embraced in total is equal to zero. The line integral along the contour ABCDA is therefore also zero. This line integral is the sum of the integrals from A to B, from B to C, from C to D and from D to A. From the symmetry it follows that the integrals of the magnetic field from A to B and from D to C are equal to each other so that the sum of the integrals from A to B and from C to D is equal to zero, and hence the sum of the integrals along the beams from B to C and from D to A is also equal to zero, which is a condition for the non-operative effect of the flux along said path.

The same applies to the contour ABEFA. This contour embraces the electric current $i$ once and the line integral along the contour is therefore equal to $i$. It should furthermore be noted that the integral from A to B is equal to $+i/2$ (because it embraces the current by half), whereas the integral from F to E in an absolute sense is also equal to $i/2$, but of opposite polarity because the current is embraced in the opposite sense. This means that the sum of the integrals from A to B and from E to F is equal to $i$ so that the sum of the integrals from B to E and from F to A along the beams is also equal to zero. Along the beams no flux will exist and hence neither along the bridges, since any flux path has to form a closed circuit.

FIG. 3 shows schematically a plurality of row conductors $R_1$, $R_2$ and $R_3$, which extend through apertures in the elements of the groups $G_1$, $G_2$, etc. In the drawing it is indicated that these conductors are passed once upwards and once downwards through the apertures of a group, but it should be considered that this number may be greater, while the number of times of upward passage has to be equal to the number of downward passages, though in any order of succession.

If in this case the line integral of the magnetic field is formed via a magnetic path through the elements of a group from the left-hand beam to the right-hand beam, between which this group is located, it is found that this line integral is zero so that along this path in series with beams and bridges of other groups no flux can be switched.

Since certain changes and modifications can be readily entered into in the practice of the present invention without departing substantially from its intended spirit or scope, it is to be fully understood that all of the foregoing description and specification be interpreted and construed as being merely illustrative of the invention and in no sense or manner as being limiting or restrictive thereof.

What is claimed is:

1. A magnetic storage device comprising a plurality of storage elements of magnetic material, each having at least one aperture, arrayed in rows and columns of a matrix and located in the same plane, each row and column having a row or column conductor associated therewith, said plane mechanically united to form a single body of magnetic material, means magnetically coupling the elements of each row with the row conductor associated therewith, means magnetically coupling the elements of each column with the column conductor associated therewith, a plurality of beams of magnetic material extending int he direction of the columns, first and second bridges of magnetic material associated with each said element and located in the same plane of symmetry as the elements and extending in the direction of the rows, said bridges connecting each element with an adjacent element of the same row or with a beam, said column conductors passing alternately upwards and downwards through said apertures of said elements and said row conductors passing an equal number of times upwards and downwards through apertures of the elements located between two beams.

2. A magnetic storage device comprising a matrix of magnetic storage elements arrayed in rows and columns in a plane, a plurality of beams of magnetic material extending along a line paralleling a column and separating pluralities of elements in each row, and a plurality of bridges of magnetic material extending along each row and interconnecting adjacent elements of said pluralities along said rows, said bridges further interconnecting elements with adjacent beams, said beams, elements and bridges together forming a mechanically integral array.

References Cited

UNITED STATES PATENTS

| | | | |
|---|---|---|---|
| 3,027,526 | 3/1962 | La Patka et al. | 336—66 |
| 3,179,927 | 4/1965 | Heimbach | 340—174 |
| 3,247,496 | 4/1966 | Erikson | 340—174 |
| 3,273,134 | 9/1966 | Lemaire et al. | 340—174 |
| 3,377,699 | 4/1968 | Dinella et al. | 340—174 |

STANLEY M. URYNOWICZ, Jr., Primary Examiner

U.S. Cl. X.R.

336—65